(No Model.)

J. WALSH, Jr.
STOP VALVE.

No. 574,768. Patented Jan. 5, 1897.

Witnesses:
F. D. Goodwin
W. A. Barr

Inventor:
James Walsh Jr.
By his Attorneys
Howson & Howson

UNITED STATES PATENT OFFICE.

JAMES WALSH, JR., OF PHILADELPHIA, PENNSYLVANIA.

STOP-VALVE.

SPECIFICATION forming part of Letters Patent No. 574,768, dated January 5, 1897.

Application filed July 25, 1892. Serial No. 441,124. (No model.)

*To all whom it may concern:*

Be it known that I, JAMES WALSH, Jr., a citizen of the United States, and a resident of Philadelphia, Pennsylvania, have invented certain Improvements in Stop-Valves, of which the following is a specification.

My invention consists of certain improvements in steam-valves, stop-cocks, and faucets, and especially in that class of valves or cocks forming the subject of my prior patents, in which valves the rotatable and threaded operating-stem is adapted to a seat in the casing and has no vertical movement therein, the valve being carried by a traversing nut guided in the casing and adapted to the threaded operating-stem.

My present improvements comprise a special form of swivel whereby the valve is hung to the nut carrying the same, and also a drainage device for permitting the escape of the fluid from the pipe on the delivery side of the valve, so as to prevent injury to said pipe or to the valve by the freezing of water therein in cold weather.

Figure 1:
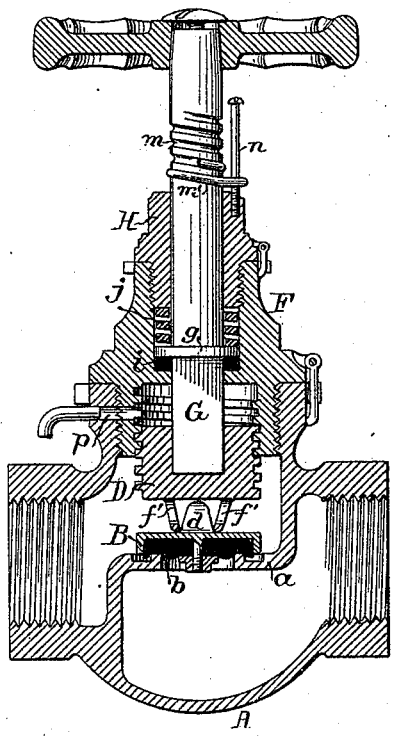
Figure 2:
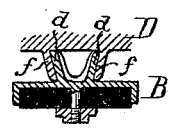
Figure 3:
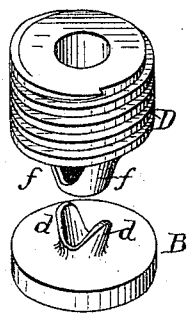

In the accompanying drawings, Figure 1 is a longitudinal section of a valve constructed in accordance with my invention. Fig. 2 is a transverse section of the valve and part of the nut which carries the same, and Fig. 3 is a perspective view of said nut and valve detached from each other.

A represents the casing of the valve, having the usual partition $a$, constituting the seat for the valve B, which has the usual packing $b$. From the back of the valve project two tapering fingers $d$, which are adapted to an inverted conical socket $f$, formed on the under side of the traversing nut D, these fingers being flared outwardly after being introduced into said socket, so as to provide a swivel which will permit free turning of the valve on the nut and yet will confine said valve vertically in position.

In the sides of the conical socket $f$ are formed openings $f'$, so that the water or other fluid has free access to the socket and can flow through the same, so as to prevent the accumulation therein of any material which would tend to cause the fingers $d$ to stick in the socket and prevent the free turning movement of the valve. The fingers also possess a certain amount of elasticity, so that they cannot be jammed so tightly in the socket as to lock the valve to the nut and prevent it from turning.

The nut D is adapted to an internally-threaded opening in the cap F of the valve, and has a central opening for engagement with a rectangular stem G, which has a collar $g$, and between the latter and a seat in the cap F is interposed a suitable packing-ring $i$, the collar being held in contact with this packing-ring by means of a spring $j$, interposed between the collar and a plug-nut H, which closes the upper end of the cap.

As the stem G, which operates the valve-nut, has no vertical movement in the casing, some means should be employed for indicating the position of the valve, and for this purpose I form in the projecting portion of the stem a screw-thread $m$, to which is adapted the coiled end of a wire $m'$, the other end of which is looped around a pin $n$, which is screwed into or otherwise detachably secured to the upper portion of the nut H and projects above the latter. Rotating movement of the wire $m'$ being thus prevented, said wire is caused to follow the thread $m$ of the valve-stem as the latter is turned, and the wire will consequently rise and fall on the pin $n$, so as to indicate the position of the valve, the pitch of the thread $m$ and that of the nut D being preferably alike.

The pin $n$ is detachable from the plug-nut H, so as to permit of the unscrewing of the latter whenever it is desired to remove the stem G or to gain access to the packing of the same, it being impossible to unscrew said plug-nut H while the pin is in position, owing to the difference in pitch of the thread of the nut and the thread $m$ on the stem of the valve.

In the upper portion of the casing A and in that portion of the cap F which is screwed into the same is formed a drainage-opening $p$, communicating at its inner end with the threaded portion of said cap to which the nut D is adapted and provided at its outer end with a suitable spout or nozzle.

The nut D fits the internal thread in the cap F so loosely that water from the discharge branch of the casing can find its way to the drainage-opening $p$ between the threads of the nut and cap when the valve B is closed and so long as there is any pressure upon the water in the discharge-chamber of the valve tending to cause it to seek said drainage-opening, as, for instance, in case where said discharge branch of the valve communicates with a vertical pipe from which it is desired to drain the water when the valve is closed, so as to prevent injury which might otherwise be caused by the freezing of the water in said pipe.

Having thus described my invention, I claim and desire to secure by Letters Patent—

1. The combination of the valve having projecting fingers at the back, with the valve-carrier having an inverted conical socket in which said fingers are expanded, said socket having side openings so as to permit the flow of fluid therethrough, substantially as specified.

2. The combination of the valve-carrying nut, with the valve-casing having an internal thread for the reception of said nut and a lateral drainage-opening passing directly through said casing and communicating with said internal thread, the nut fitting loosely in said thread so as to provide a passage between the threads to the drainage-opening when the valve is closed, substantially as specified.

In testimony whereof I have signed my name to this specification in the presence of two subscribing witnesses.

JAMES WALSH, Jr.

Witnesses:
FRANK E. BECHTOLD,
HARRY SMITH.